(12) United States Patent
Yau

(10) Patent No.: US 10,206,267 B2
(45) Date of Patent: Feb. 12, 2019

(54) METHOD AND SYSTEM FOR AUTOMATICALLY IMPLEMENTING LIGHTING CONTROL SCENE

(71) Applicant: Delight Innovative Technologies Limited, Hong Kong (CN)

(72) Inventor: Kin Hing Yau, Hong Kong (CN)

(73) Assignee: Delight Innovative Technologies Limited, Hong Kong (CN)

( * ) Notice: Subject to any disclaimer, the term of this patent is extended or adjusted under 35 U.S.C. 154(b) by 0 days.

(21) Appl. No.: 15/767,484

(22) PCT Filed: Oct. 12, 2016

(86) PCT No.: PCT/CN2016/101855
§ 371 (c)(1),
(2) Date: Apr. 11, 2018

(87) PCT Pub. No.: WO2017/063556
PCT Pub. Date: Apr. 20, 2017

(65) Prior Publication Data
US 2018/0302975 A1 Oct. 18, 2018

(30) Foreign Application Priority Data
Oct. 12, 2015 (CN) .......................... 2015 1 0656897

(51) Int. Cl.
*H05B 37/02* (2006.01)
*H05B 33/08* (2006.01)
(Continued)

(52) U.S. Cl.
CPC ......... *H05B 37/0227* (2013.01); *G05D 25/02* (2013.01); *G06F 3/01* (2013.01);
(Continued)

(58) Field of Classification Search
CPC ............ H05B 37/0245; H05B 37/0254; H05B 37/0272; H05B 37/0227; H05B 37/029;
(Continued)

(56) References Cited

U.S. PATENT DOCUMENTS 7,268,780 B2 * 9/2007 Shibano ................. H05B 37/02
345/426
8,412,359 B2 * 4/2013 Boleko Ribas ...... H05B 37/029
700/11
(Continued)

FOREIGN PATENT DOCUMENTS

| CN | 103561345 A | 2/2014 |
| CN | 104144353 A | 11/2014 |
| CN | 104797045 A | 7/2015 |

OTHER PUBLICATIONS

International Search Report from PCT Application No. PCT/CN2016/101855 (published as WO 2017/063556 dated Apr. 20, 2017) including its English-language translation, dated Jan. 12, 2017, which is the parent application to the instant application, 5 pages.
(Continued)

*Primary Examiner* — Vibol Tan
(74) *Attorney, Agent, or Firm* — Harness, Dickey & Pierce, P.L.C.; Anthony G. Fussner

(57) ABSTRACT

The invention provides a method and system for automatically implementing lighting control scene. The method comprises following steps: connecting the lighting control module to a scene design module, establishing a correspondence between an actual scene controlled by the lighting control module and a simulated scene designed by the scene design module, the photosensitive spots set in the actual scene are mapped to fixed light spots in the simulated scene; connecting photosensitive matrix modules that can be mounted on an indoor ceiling to the scene design module, establishing a correspondence between a sensing range map
(Continued)

and a simulated sensing range map, so that the photosensitive spots correspond to at least one light measuring spot on the photosensitive matrix module, the simulated light measuring spots of the simulated photosensitive matrix module correspond to the light measuring spots of the photosensitive matrix modules one to one; The scene design module overlays the simulated scene with the simulated sensing range map, to associate the fixed light spots with the simulated light measuring spots, associate the fixed light spots with the light measuring spots, so that the photosensitive spots correspond to the light measuring spots. Through above steps, the scene designed and rendered by the computer can be directly transplanted to the entity lighting control system, thereby realizing the effect of designing the lighting control.

20 Claims, 2 Drawing Sheets

(51) Int. Cl.
| | | |
|---|---|---|
| *G06F 3/01* | (2006.01) | |
| *G06F 3/03* | (2006.01) | |
| *G05D 25/02* | (2006.01) | |
| *G06F 3/0354* | (2013.01) | |

(52) U.S. Cl.
CPC ....... *G06F 3/03547* (2013.01); *H05B 33/083* (2013.01); *H05B 33/0869* (2013.01); *H05B 33/0872* (2013.01)

(58) Field of Classification Search
CPC ............ H05B 33/0857; H05B 33/0863; H05B 37/02; H05B 33/0842; H05B 37/00; H04N 5/23212; H04N 5/2354; H04N 21/43615; H04N 5/147; H04N 5/58; G08B 5/36; H04B 10/116; G05D 25/02
See application file for complete search history.

(56) References Cited

U.S. PATENT DOCUMENTS

| | | | |
|---|---|---|---|
| 9,014,828 B2 * | 4/2015 | Martello | H05B 37/02 |
| | | | 700/83 |
| 9,049,756 B2 * | 6/2015 | Klusmann | H05B 37/0218 |
| 9,137,878 B2 * | 9/2015 | Thompson | H05B 37/0227 |
| 9,386,665 B2 * | 7/2016 | Nelson | H05B 37/0245 |
| 9,565,733 B2 * | 2/2017 | Saffari | H05B 37/0272 |
| 9,967,959 B2 * | 5/2018 | Lim Chi Cheung | |
| | | | G06F 3/03547 |
| 2008/0192058 A1 * | 8/2008 | Liu | A63F 13/12 |
| | | | 345/473 |
| 2016/0330819 A1 * | 11/2016 | Leadford | H05B 33/0863 |
| 2017/0116788 A1 * | 4/2017 | Chenglei | H04N 13/351 |

OTHER PUBLICATIONS

Written Opinion from PCT Application No. PCT/CN2016/101855 (published as WO 2017/063556 dated Apr. 20, 2017) stating that all claims are patentable, which is the parent application to the instant application, Jan. 12, 2017, 3 pages.

* cited by examiner

METHOD AND SYSTEM FOR AUTOMATICALLY IMPLEMENTING LIGHTING CONTROL SCENE

This patent application is a U.S. national stage filing under 35 U.S.C. § 371 of International Application No. PCT/CN2016/101855 filed Oct. 12, 2016 (published as WO 2017/063556 on Apr. 20, 2017), which claims priority of Chinese application No. CN201510656897.8 filed Oct. 12, 2015. The disclosures of the applications identified in this paragraph are incorporated herein by reference in their entirety.

TECHNICAL FIELD

The present invention relates to technical fields of automatic lighting control technology, lighting control system and specialized device, and in particular to a method and system for automatically implementing a lighting control scene.

BACKGROUND TECHNIQUE

At present, softwares for designing indoor lighting control system and lighting based on computer has become popular. These designing softwares are not only used to design scenes that are illuminated by lights, but are even mature in scene rendering. However, unfortunately, the well-designed scene still requires constructers to construct on site according to designer's design drawings. The construction consumes a lot of manpower. Moreover, the constructers must cooperate with the designers or the construction must be implemented by the constructers who understand the drawings, thus requiring expensive professional personnel, and costly manpower and capital costs during construction.

SUMMARY OF THE INVENTION

The invention solves the problem that the lighting system of which the scene has been designed by software must also consume the manpower of professionals during installing. The invention provides a method for automatically implementing a lighting control scene, a system and a special device for automatically implementing a lighting control scene. Therefore, with the intelligent lighting control system, the scene designed and rendered by the computer can be directly transplanted to the entity lighting control system without assistance or involvement of professionals, so that the assistance of the professional installer or the designer is completely unnecessary while achieving the effect of designing the lighting control.

The technical solution of the present invention is as follows:

A method for automatically implementing a lighting control scene, wherein the lighting control refers to a lighting control module capable of implementing intelligent lighting control, the method comprising following steps:

1) Connecting the lighting control module to a scene design module, establishing a correspondence between an actual scene controlled by the lighting control module and a simulated scene designed by the scene design module, wherein the actual scene is determined by several photosensitive spots and their brightness values in each illumination area that needs lighting; wherein the photosensitive spots are mapped to fixed light spots in the simulated scene; wherein the scene design module sets a region range of the simulated scene corresponding to the actual scene, defines its boundary and coordinates, designs the simulated scene displayed by graphic, and generates locations of the fixed light spots and their brightness values;

2) Connecting one or more photosensitive matrix modules that can be mounted on an indoor ceiling to the scene design module, establishing a correspondence between a sensing range map of the photosensitive matrix module and a simulated scene design module, wherein the photosensitive matrix module detects the brightness of each spot in an indoor illumination area, and according to a correspondence between the photosensitive spots and the fixed light spots, associates the photosensitive spots with at least one light measuring spot on the photosensitive matrix module; wherein the simulated light measuring spots of the simulated photosensitive matrix module correspond to the light measuring spots one to one;

3) The scene design module overlays the simulated scene with the simulated sensing range map, to associate the fixed light spots with the simulated light measuring spots of the simulated sensing range map of the simulated photosensitive matrix module, associate the fixed light spots with the light measuring spots, so that the photosensitive spots correspond to the light measuring spots.

The photosensitive matrix module is an array of photosensitive elements composed of a plurality of photosensitive elements, each photosensitive element senses an illuminated point in a particular direction, and the array of photosensitive elements is a rectangular array, a hexagonal honeycomb array, or other ordered geometric combination.

The overlay of step 3) include an optimized overlay, i.e., the scene design module automatically overlays the simulated scene with the least number of photosensitive matrix modules; and/or, the scene design module sets the region range of the simulated scene corresponding to the actual scene, defines its boundary and plane coordinates, designs the simulated scene displayed in a two-dimensional plan view, and generates the locations and brightness values of the fixed light spots.

The one or more photosensitive matrix modules are located in a definite position on the ceiling which coincides with the orientation of the photosensitive matrix module determined after the simulated sensing range map is overlaid to cover the simulated scene, and the orientation of the photosensitive matrix module includes its mounting center, direction of a center axis, and inclination angles of the photosensitive elements.

When the photosensitive matrix modules are located in indefinite positions on the ceiling, several lighting positioners are also provided, and the lighting positioners are located in illumination areas respectively, each illuminated area includes at least three lighting positioners, the orientation of the photosensitive matrix module in the area on the ceiling is determined by the lighting positioner to obtain the light measuring spot, the orientation of the photosensitive matrix module includes mounting center, direction of center axis and rotation direction of each photosensitive matrix module.

When the photosensitive matrix modules are located in indefinite positions on the ceiling, a plane sensing device is also provided, the plane sensing device photographs the illumination area as a lighting plan view, and compares it with the simulated scene to obtain the actual photosensitive spots, thereby obtaining the light measuring spots to set the scene requirements.

A system for automatically implementing a lighting control scene is characterized in including a scene design module and a photosensitive matrix module connected thereto, The scene design module includes a scene relationship establishing module and a simulated scene establishing module, the scene relationship establishing module is used to establish a correspondence between an actual scene controlled by a lighting control module and a simulated scene designed by the scene design module, the lighting control module is used to implement the actual scene which is determined by several photosensitive points and their brightness values in each illumination area that needs lighting; the photosensitive spots are mapped into fixed light spots in the simulated scene by the scene relationship establishing module, the simulated scene establishing module sets a region range of the simulated scene corresponding to the actual scene, defines the boundary and coordinates thereof, and designs the simulated scene displayed by graphic to generate the positions and brightness values of the fixed light spots;

The scene design module also includes a sensing relationship establishing module, the sensing relationship establishing module establishes a correspondence between a sensing range map of the photosensitive matrix module and a simulated sensing range map of the simulated photosensitive matrix module designed by the scene design module, the photosensitive matrix module can detect the brightness of various spots in an illumination area in a room, the sensing relationship establishing module associates the photosensitive spots with at least one light measuring spot on the photosensitive matrix module according to a correspondence between the photosensitive spots and the fixed light spots, and associates the simulated light measuring spots of the simulated photosensitive matrix module with, one to one respectively, to the light measuring spots;

The scene design module also includes an overlay module, the overlay module is used for overlaying the simulated sensing range map onto the simulated scene so that the fixed light spots correspond to the simulated light measuring spots of the simulated sensing range map of the simulated photosensitive matrix module, thereby associating the photosensitive spots with the light measuring spots.

The photosensitive matrix module is an array of photosensitive elements composed of a plurality of photosensitive elements, each photosensitive element senses an illuminated point in a particular direction, and the array of photosensitive elements is a rectangular array, a hexagonal honeycomb array, or other ordered geometric combination.

The overlay module include an optimized overlay module, i.e., the scene design module automatically overlays the simulated scene with the least number of photosensitive matrix modules; and/or, the scene design module sets the region range of the simulated scene corresponding to the actual scene, defines its boundary and plane coordinates, designs the simulated scene displayed in a two-dimensional plan view, and generates the locations and brightness values of the fixed light spots.

The system further includes lighting positioners, the lighting positioners are located in illumination areas respectively, each illuminated area includes at least three lighting positioners, the orientation of the photosensitive matrix module in the area on the ceiling is determined by the lighting positioner to obtain the light measuring spot, the orientation of the photosensitive matrix module includes mounting center, direction of center axis and rotation direction of each photosensitive matrix module.

The system further includes a plane sensing device, the plane sensing device photographs the illumination area as a lighting plan view, and compares it with the simulated scene to obtain the actual photosensitive spots, thereby obtaining the light measuring spots to set the scene requirements.

The technical effects of the present invention are as follows:

The method and system according to the present invention is directed to a smart lighting control system. Due to the establishment of the correspondence between the actual scene and the simulated scene, the correspondence between the sensing range map of the photosensitive matrix module and the simulated sensing range map, and the correspondence between the photosensitive spots and the light measuring spots, after the lighting control simulated scene is designed, it is only needed to mount the photosensitive matrix modules on the fixed or non-fixed position (arbitrary) on the ceiling after the lights controlled by intelligent lighting control have been installed, The intelligent lighting control can automatically implement the defined simulated scene through the auto calculation and diming according to the brightness required by the light measuring spots.

The reference numbers in the figures are listed as follows:
1—fixed light spot; 2—photosensitive spot; 3—simulated light measuring spot; 4—light measuring spot.

DETAILED DESCRIPTION OF EMBODIMENTS

The present invention will be described below with reference to the accompanying drawings.

Figure 1:
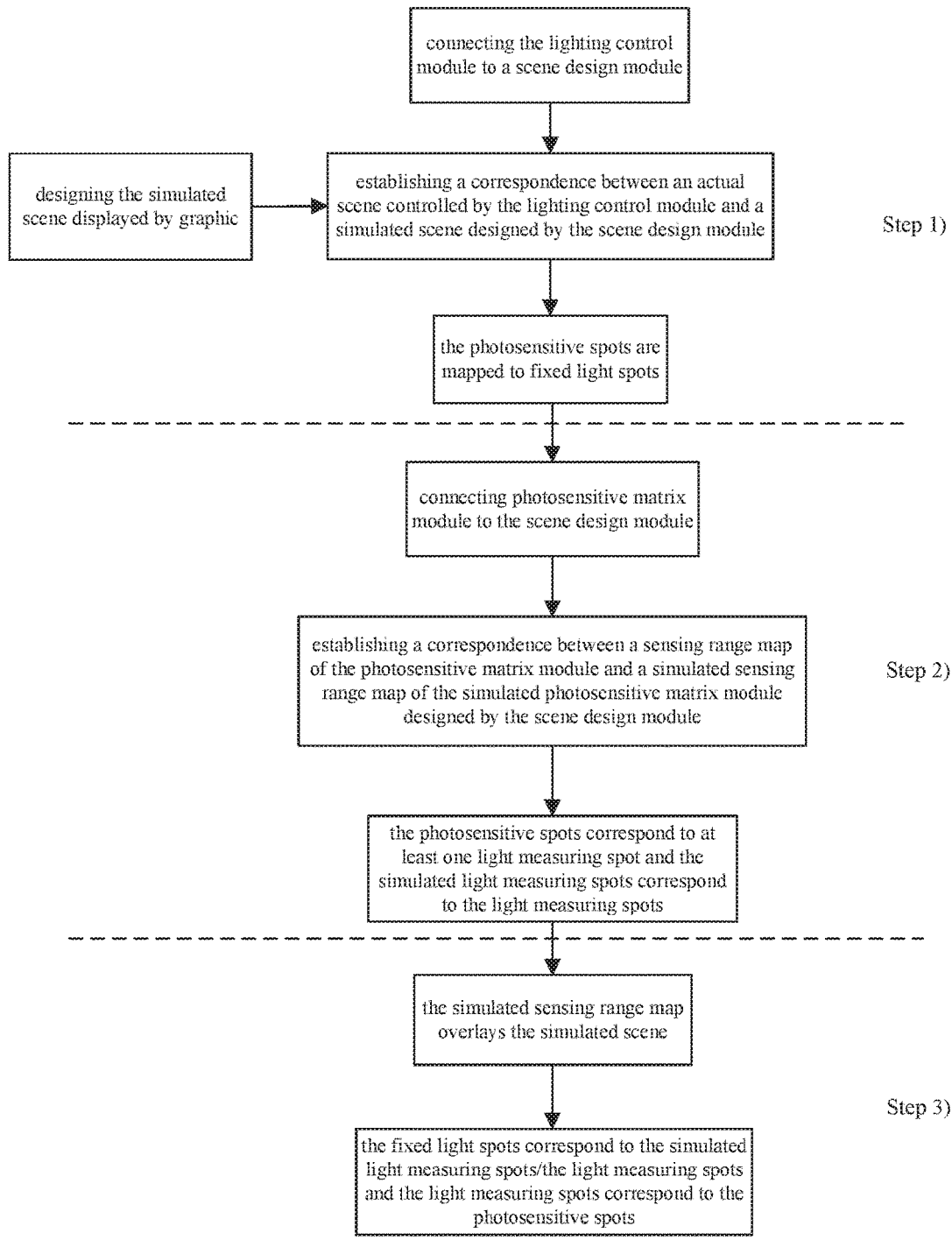
FIG. 1 is a flowchart of a method for automatically implementing a lighting control scene according to the present invention.
Figure 2:
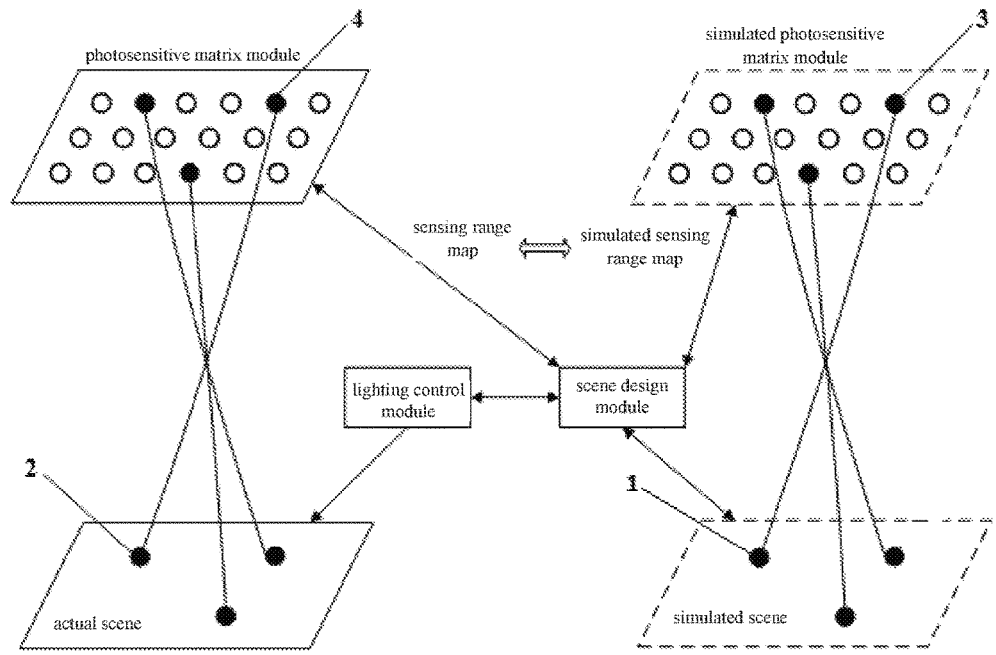
FIG. 2 is a schematic diagram of a structure of a lighting control scene automatically implemented according to the present invention.

FIG. 1 is a flowchart of a method for automatically implementing a lighting control scene according to the present invention. Lighting control here refers to a lighting control module that can implement intelligent lighting control. FIG. 2 is a schematic diagram of the structure of a lighting control scene implemented by the method for automatically implementing a lighting control scene according to the present invention. As shown in FIG. 1, the method specifically includes following steps:

Step 1)

A) Connecting the lighting control module to the scene design module. The lighting control module is a lighting control device that cooperates with the scene design module to realize intelligent lighting control, and is used to implement an actual scene of illumination areas under control of lighting, that require lighting. The actual scene is determined by several photosensitive spots and their brightness values in each illumination area that needs lighting. In the illumination area shown in the actual scene as shown in FIG. 2, there are three photosensitive spots 2, and according to the actual scene application, the brightness values of the three photosensitive spots 2 are respectively set, for example 700 lux;

B) Establishing the correspondence between the actual scene controlled by the lighting control module and the simulated scene designed by the scene design module. According to the actual situation, the scene design module can be used to design to display the simulated scene in various ways;

C) Mapping photosensitive spots to fixed light spots in the simulated scene designed by the scene design module. As shown in FIG. 2, the three photosensitive spots 2 in the illumination area in the actual scene are respectively mapped one by one to three fixed light spots 1 in the corresponding simulated scene. And, according to the actual application, the setting method and the number of photosensitive spots/fixed light spots can be selected. For example, when applied to a relatively small illumination area, at least 3 or more photosensitive spots/fixed light spots may be set. Or, for example, when applied to a relatively large illumination area, a minimum interval between adjacent photosensitive spots/fixed light spots may be preset, for example, as a value not less than 50 cm, so that the photosensitive spots/fixed light spots can be automatically set;

D) The scene design module sets the region range of the simulated scene corresponding to the actual scene, defines its boundary and coordinates, and generates the locations of the fixed light spots and their brightness values. Preferably, the simulated scene can be designed to be displayed in a two-dimensional plan view. The boundary and plane coordinates of the simulated scene are defined. The locations and brightness values of the fixed light spots are generated. In practical applications, when there are no items such as furniture in the actual scenes within illumination areas that need lighting, the corresponding simulated scene can outline the illumination areas (e.g., the boundary between the wall and the floor of the room) to define the boundary and plane coordinates thereof, and then to generate the locations and brightness values of the fixed light spots. When there are items such as furniture in the actual scenes within illumination areas that need lighting or items intended to be placed such as furniture, the corresponding simulated scene can draw out graphs according to shapes of the existing furniture or the reference/conceived furniture, and can define the boundary and plane coordinates of the illumination area in combination with boarderline of the places that need lighting, and then generate the locations and brightness values of the fixed light spots.

Step 2)

A) Connecting one or more photosensitive matrix modules that can be mounted on the indoor ceiling to the scene design module. The photosensitive matrix module may be an array of photosensitive elements composed of a plurality of photosensitive elements. Each photosensitive element senses an illuminated point in a particular direction (i.e., the photosensitive spots 2 and the fixed light spots 1 in the present invention, as shown in FIG. 2). The array of photosensitive elements can be a rectangular array, a hexagonal honeycomb array, or other ordered geometric combination. The number of photosensitive elements can be selected according to the actual application in combination with the budget, for example, 80 to 120. The photosensitive matrix module shown in FIG. 2 is composed of a rectangular array of photosensitive elements consisting of N×M photosensitive elements;

B) Establishing the correspondence between the sensing range map of the photosensitive matrix module and the simulated sensing range map of the simulated photosensitive matrix module designed by the scene design module. That is, according to the photosensitive matrix module that can be mounted on the indoor ceiling, the scene design module designs corresponding simulated photosensitive matrix module. The arrangement and number of the elements constituting the analog photosensitive matrix module are identical to those of the actual mounted photosensitive matrix module, as shown in FIG. 2;

C) The photosensitive matrix module detects the brightness of each spot in an illumination area of the room, and according to the correspondence between the photosensitive spots and the fixed light spots, associates the photosensitive spots with at least one light measuring spot on the photosensitive matrix module. The simulated light measuring spots of the simulated photosensitive matrix module correspond to the light measuring spots one to one, as shown in FIG. 2. That is, the photosensitive matrix module maps the photosensitive spots 2 to the three light measuring spots 4 on the photosensitive matrix module according to the correspondence between the photosensitive spot 2 and the fixed light spot 1 so that the three simulated light measuring spot 3 of the photosensitive matrix module 3 correspond to the three light measuring spot 4 one to one.

Step 3)

A) The scene design module overlays the simulated scene with the simulated sensing range map to cover the fixed light spots in the simulated scene; Preferably, the optimized coverage can be performed, that is, the scene design module automatically covers the simulated scene with the minimum number of photosensitive matrix modules, i.e., covers a majority of the fixed light spots in the simulated scene with the minimum number of photosensitive matrix modules. And the ideal situation is fall coverage;

B) Associating the fixed light spots with the simulated light measuring spots of the simulated sensing range map of the simulated photosensitive matrix module. Since the fixed light spots correspond to the light measuring spots, the photosensitive spots correspond to the light measuring spots, as shown in FIG. 2. In other words, it is achieved finally that the three fixed light spots 1 correspond, one to one respectively, to the three simulated light measuring spots 3 of the simulated sensing range map of the simulated photosensitive matrix module, and the three fixed light spots 1 correspond, one to one respectively, to the three light measuring spots 4, so that the three photosensitive spots 2 correspond, one to one respectively, to the three light measuring spots 4. Of course, there can also be four photosensitive spots 2 and other brightness values.

Through above steps, the scene designed and rendered by the computer (i.e., the simulated scene related to the present invention, as shown in FIG. 2) can be directly transplanted to the entity lighting control system (for example, the lighting control module related to the present invention, as shown in FIG. 2) without the assistance or involvement of professionals. While achieving the effect of designing the lighting control, the assistance of the professional installer or the designer is completely unnecessary, thereby saving the design and installation cycle and cost.

In practical applications, when the orientation of the photosensitive matrix module mounted on the ceiling coincides with the orientation of the simulated photosensitive matrix module after its simulated sensing range map covering the simulated scene, i.e., the definite position on the ceiling of one or more photosensitive matrix modules which coincides with the orientation of the photosensitive matrix module determined after the simulated sensing range map is overlaid to cover the simulated scene, and wherein the position coordinates of each of the photosensitive spots, the fixed light spots, the light measuring spots, and the simulated light measuring point have been determined, the transplantation of the scene designed and rendered by computer can be automatically implemented according to the above method for automatically implementing a lighting control scene. Wherein, the orientation of the photosensitive matrix module includes its mounting center, the direction of the center axis, and the inclination angles of the photosensitive elements.

In practical applications, when the orientation of the photosensitive matrix module mounted on the ceiling is inconsistent with the orientation of the simulated photosensitive matrix module after its simulated sensing range map has covered the simulated scene, i.e., one or more photosensitive matrix modules are located in indefinite positions on the ceiling. Several lighting positioners can also be provided. The lighting positioners are located in illumination areas respectively. Each illuminated area includes at least three lighting positioners. The orientation of each photosensitive matrix module in the area on the ceiling is determined by the lighting positioner to obtain the light measuring spot. The orientation of the photosensitive matrix module includes the mounting center, the direction of center axis, and the rotation direction of each photosensitive matrix module.

When the photosensitive matrix modules are located in definite positions on the ceiling, a plane sensing device may also be provided. The plane sensing device photographs the illumination area as a lighting plan view, and compares it with the simulated scene (i.e., compares it with a simulated scene displayed on a two-dimensional plan view) to obtain the actual photosensitive spots, thereby obtaining the light measuring spots to set the scene requirements.

Figure 3:
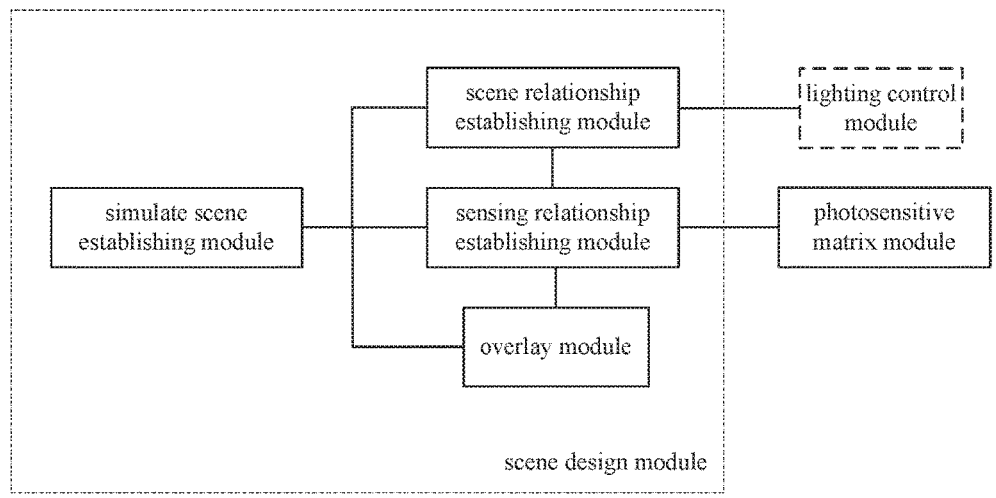
FIG. 3 is a schematic diagram of a structure of a system for automatically implementing a lighting control scene according to the present invention.

The invention also relates to a system for automatically implementing a lighting control scene. The system corresponds to above method of automatically implementing a lighting control scene. It can also be understood that the system is a system for implementing above method. The lighting control refers to the lighting control module as shown in FIG. 3 that can realize the intelligent lighting control. The structure of the system is shown in FIG. 3, including a scene design module and a photosensitive matrix module connected thereto. Wherein, The scene design module includes a scene relationship establishing module and a simulated scene establishing module connected to each other. The scene relationship establishing module is also connected with the lighting control module. The scene relationship establishing module is used to establish the correspondence between the actual scene controlled by the lighting control module and the simulated scene designed by the scene design module. The lighting control module is used to implement the actual scene which is determined by several photosensitive points and their brightness values in each illumination area that needs lighting. The photosensitive spots are mapped into fixed light spots in the simulated scene by the scene relationship establishing module. The simulated scene establishing module sets the region range of the simulated scene corresponding to the actual scene, defines the boundary and coordinates thereof, designs the simulated scene displayed by the graphic, and generates the positions and brightness values of the fixed light spots. Preferably, the simulation scene can be designed to be displayed in a two-dimensional plan view. Its boundary and plane coordinates are defined. And the positions and the brightness values of the fixed light spots are generated;

The scene design module also includes a sensing relationship establishing module. The sensing relationship establishing module is respectively connected with the photosensitive matrix module, the scene relationship establishing module and the simulated scene establishing module. The sensing relationship establishing module establishes the correspondence between the sensing range map of the photosensitive matrix module and the simulated sensing range map of the simulated photosensitive matrix module designed by the scene design module. The photosensitive matrix module can detect the brightness of various spots in an illumination area in a room. The sensing relationship establishing module associates the photosensitive spots with at least one light measuring spot on the photosensitive matrix module according to the correspondence between the photosensitive spots and the fixed light spots, and associates the simulated light measuring spots of the simulated photosensitive matrix module with, one to one respectively, to the light measuring spots;

The scene design module also includes an overlay module. The overlay module is respectively connected with the sensing relationship establishing module and the simulated scene establishing module, and is used for overlaying the simulated sensing range map onto the simulated scene so that the fixed light spots correspond to the simulated light measuring spots of the simulated sensing range map of the simulated photosensitive matrix module, thereby associating the photosensitive spots with the light measuring spots.

Preferably, the photosensitive matrix module may be an array of photosensitive elements composed of a plurality of photosensitive elements. Each photosensitive element senses an illuminated point in a particular direction. The array of photosensitive elements can be a rectangular array, a hexagonal honeycomb array, or other ordered geometric combination.

The overlay module may include an optimized overlay module, i.e., the scene design module automatically overlays the simulated scene with the least number of photosensitive matrix modules.

The system can also include lighting positioners. The lighting positioners are located in illumination areas respectively. Each illuminated area includes at least three lighting positioners. The orientation of the photosensitive matrix module in the area on the ceiling is determined by the lighting positioner to obtain the light measuring spot. The orientation of the photosensitive matrix module includes the mounting center, the direction of center axis, and the rotation direction of each photosensitive matrix module.

Plane sensing devices can also be included. The plane sensing device photographs the illumination area as a lighting plan view, and compares it with the simulated scene to obtain the actual photosensitive spots, thereby obtaining the light measuring spots to set the scene requirements.

It should be noted that the above-described embodiments may make those skilled in the art more fully understand the present invention, but do not limit the invention in any way. Therefore, although the invention has been described in detail in this specification with reference to the accompanying drawings and embodiments, those skilled in the art should understand that modifications or equivalent substitutions can still be made to the invention. In short, all technical solutions and improvements that do not deviate from the spirit and scope of the present invention shall all be covered by the protection scope of the present invention.

The invention claimed is:

1. A method for automatically implementing a lighting control scene, wherein the lighting control refers to a lighting control module capable of implementing intelligent lighting control, the method comprising following steps:
   1) connecting the lighting control module to a scene design module, establishing a correspondence between an actual scene controlled by the lighting control module and a simulated scene designed by the scene design module, wherein the actual scene is determined by several photosensitive spots and their brightness values in each illumination area that needs lighting; wherein the photosensitive spots are mapped to fixed light spots in the simulated scene; wherein the scene design module sets a region range of the simulated scene corresponding to the actual scene, defines its boundary and coordinates, designs the simulated scene displayed by graphic, and generates locations of the fixed light spots and their brightness values;

2) connecting one or more photosensitive matrix modules that can be mounted on an indoor ceiling to the scene design module, establishing a correspondence between a sensing range map of the photosensitive matrix module and a simulated sensing range map of the simulated photosensitive matrix module designed by the scene design module, wherein the photosensitive matrix module detects the brightness of each spot in an indoor illumination area, and according to a correspondence between the photosensitive spots and the fixed light spots, associates the photosensitive spots with at least one light measuring spot on the photosensitive matrix module, wherein the simulated light measuring spots of the simulated photosensitive matrix module correspond to the light measuring spots one to one;

3) the scene design module overlays the simulated scene with the simulated sensing range map, to associate the fixed light spots with the simulated light measuring spots of the simulated sensing range map of the simulated photosensitive matrix module, associate the fixed light spots with the light measuring spots, so that the photosensitive spots correspond to the light measuring spots.

2. The method for automatically implementing the lighting control scene according to claim 1, wherein the photosensitive matrix module is an array of photosensitive elements composed of a plurality of photosensitive elements, each photosensitive element senses an illuminated point in a particular direction, and the array of photosensitive elements is a rectangular array, a hexagonal honeycomb array, or other ordered geometric combination.

3. The method for automatically implementing the lighting control scene according to claim 2, wherein the overlay of step 3) include an optimized overlay, i.e., the scene design module automatically overlays the simulated scene with the least number of photosensitive matrix modules; and/or, the scene design module sets the region range of the simulated scene corresponding to the actual scene, defines its boundary and plane coordinates, designs the simulated scene displayed in a two-dimensional plan view, and generates the locations and brightness values of the fixed light spots.

4. The method for automatically implementing the lighting control scene according to claim 2, wherein the one or more photosensitive matrix modules are located in a definite position on the ceiling which coincides with the orientation of the photosensitive matrix module determined after the simulated sensing range map is overlaid to cover the simulated scene, and the orientation of the photosensitive matrix module includes its mounting center, direction of a center axis, and inclination angles of the photosensitive elements.

5. The method for automatically implementing the lighting control scene according to claim 1, wherein the photosensitive matrix modules are located in indefinite positions on the ceiling, several lighting positioners are also provided, and the lighting positioners are located in illumination areas respectively, each illuminated area includes at least three lighting positioners, the orientation of the photosensitive matrix module in the area on the ceiling is determined by the lighting positioner to obtain the light measuring spot, the orientation of the photosensitive matrix module includes mounting center, direction of center axis and rotation direction of each photosensitive matrix module.

6. The method for automatically implementing the lighting control scene according to claim 1, wherein the photosensitive matrix modules are located in indefinite positions on the ceiling, a plane sensing device is also provided, the plane sensing device photographs the illumination area as a lighting plan view, and compares it with the simulated scene to obtain the actual photosensitive spots, thereby obtaining the light measuring spots to set the scene requirements.

7. A system for automatically implementing a lighting control scene is characterized in including a scene design module and a photosensitive matrix module connected thereto, the scene design module includes a scene relationship establishing module and a simulated scene establishing module, the scene relationship establishing module is used to establish a correspondence between an actual scene controlled by a lighting control module and a simulated scene designed by the scene design module, the lighting control module is used to implement the actual scene which is determined by several photosensitive points and their brightness values in each illumination area that needs lighting; the photosensitive spots are mapped into fixed light spots in the simulated scene by the scene relationship establishing module, the simulated scene establishing module sets a region range of the simulated scene corresponding to the actual scene, defines the boundary and coordinates thereof, and designs the simulated scene displayed by graphic to generate the positions and brightness values of the fixed light spots;

the scene design module also includes a sensing relationship establishing module, the sensing relationship establishing module establishes a correspondence between a sensing range map of the photosensitive matrix module and a simulated sensing range map of the simulated photosensitive matrix module designed by the scene design module, the photosensitive matrix module can detect the brightness of various spots in an illumination area in a room, the sensing relationship establishing module associates the photosensitive spots with at least one light measuring spot on the photosensitive matrix module according to a correspondence between the photosensitive spots and the fixed light spots, and associates the simulated light measuring spots of the simulated photosensitive matrix module with, one to one respectively, to the light measuring spots;

the scene design module also includes an overlay module, the overlay module is used for overlaying the simulated sensing range map onto the simulated scene so that the fixed light spots correspond to the simulated light measuring spots of the simulated sensing range map of the simulated photosensitive matrix module, thereby associating the photosensitive spots with the light measuring spots.

8. The system for automatically implementing the lighting control scene according to claim 7, wherein the photosensitive matrix module is an array of photosensitive elements composed of a plurality of photosensitive elements, each photosensitive element senses an illuminated point in a particular direction, and the array of photosensitive elements is a rectangular array, a hexagonal honeycomb array, or other ordered geometric combination.

9. The system for automatically implementing the lighting control scene according to claim 8, wherein the overlay module include an optimized overlay module, i.e., the scene design module automatically overlays the simulated scene with the least number of photosensitive matrix modules; and/or, the scene design module sets the region range of the simulated scene corresponding to the actual scene, defines its boundary and plane coordinates, designs the simulated scene displayed in a two-dimensional plan view, and generates the locations and brightness values of the fixed light spots.

10. The system for automatically implementing the lighting control scene according to claim 7, further comprising lighting positioners, the lighting positioners are located in illumination areas respectively, each illuminated area includes at least three lighting positioners, the orientation of the photosensitive matrix module in the area on the ceiling is determined by the lighting positioner to obtain the light measuring spot, the orientation of the photosensitive matrix module includes mounting center, direction of center axis and rotation direction of each photosensitive matrix module.

11. The system for automatically implementing the lighting control scene according to claim 7, further comprising a plane sensing device, the plane sensing device photographs the illumination area as a lighting plan view, and compares it with the simulated scene to obtain the actual photosensitive spots, thereby obtaining the light measuring spots to set the scene requirements.

12. The method for automatically implementing the lighting control scene according to claim 3, wherein the one or more photosensitive matrix modules are located in a definite position on the ceiling which coincides with the orientation of the photosensitive matrix module determined after the simulated sensing range map is overlaid to cover the simulated scene, and the orientation of the photosensitive matrix module includes its mounting center, direction of a center axis, and inclination angles of the photosensitive elements.

13. The method for automatically implementing the lighting control scene according to claim 2, wherein the photosensitive matrix modules are located in indefinite positions on the ceiling, several lighting positioners are also provided, and the lighting positioners are located in illumination areas respectively, each illuminated area includes at least three lighting positioners, the orientation of the photosensitive matrix module in the area on the ceiling is determined by the lighting positioner to obtain the light measuring spot, the orientation of the photosensitive matrix module includes mounting center, direction of center axis and rotation direction of each photosensitive matrix module.

14. The method for automatically implementing the lighting control scene according to claim 3, wherein the photosensitive matrix modules are located in indefinite positions on the ceiling, several lighting positioners are also provided, and the lighting positioners are located in illumination areas respectively, each illuminated area includes at least three lighting positioners, the orientation of the photosensitive matrix module in the area on the ceiling is determined by the lighting positioner to obtain the light measuring spot, the orientation of the photosensitive matrix module includes mounting center, direction of center axis and rotation direction of each photosensitive matrix module.

15. The method for automatically implementing the lighting control scene according to claim 2, wherein the photosensitive matrix modules are located in indefinite positions on the ceiling, a plane sensing device is also provided, the plane sensing device photographs the illumination area as a lighting plan view, and compares it with the simulated scene to obtain the actual photosensitive spots, thereby obtaining the light measuring spots to set the scene requirements.

16. The method for automatically implementing the lighting control scene according to claim 3, wherein the photosensitive matrix modules are located in indefinite positions on the ceiling, a plane sensing device is also provided, the plane sensing device photographs the illumination area as a lighting plan view, and compares it with the simulated scene to obtain the actual photosensitive spots, thereby obtaining the light measuring spots to set the scene requirements.

17. The system for automatically implementing the lighting control scene according to claim 8, further comprising lighting positioners, the lighting positioners are located in illumination areas respectively, each illuminated area includes at least three lighting positioners, the orientation of the photosensitive matrix module in the area on the ceiling is determined by the lighting positioner to obtain the light measuring spot, the orientation of the photosensitive matrix module includes mounting center, direction of center axis and rotation direction of each photosensitive matrix module.

18. The system for automatically implementing the lighting control scene according to claim 9, further comprising lighting positioners, the lighting positioners are located in illumination areas respectively, each illuminated area includes at least three lighting positioners, the orientation of the photosensitive matrix module in the area on the ceiling is determined by the lighting positioner to obtain the light measuring spot, the orientation of the photosensitive matrix module includes mounting center, direction of center axis and rotation direction of each photosensitive matrix module.

19. The system for automatically implementing the lighting control scene according to claim 8, further comprising a plane sensing device, the plane sensing device photographs the illumination area as a lighting plan view, and compares it with the simulated scene to obtain the actual photosensitive spots, thereby obtaining the light measuring spots to set the scene requirements.

20. The system for automatically implementing the lighting control scene according to claim 9, further comprising a plane sensing device, the plane sensing device photographs the illumination area as a lighting plan view, and compares it with the simulated scene to obtain the actual photosensitive spots, thereby obtaining the light measuring spots to set the scene requirements.

\* \* \* \* \*